United States Patent
King et al.

(10) Patent No.: US 10,833,340 B2
(45) Date of Patent: Nov. 10, 2020

(54) APPARATUS AND METHOD FOR DETERMINING STATE OF CHARGE IN A REDOX FLOW BATTERY VIA LIMITING CURRENTS

(71) Applicant: Lockheed Martin Energy, LLC, Bethesda, MD (US)

(72) Inventors: Evan R. King, Quincy, MA (US); Kean Duffey, Brighton, MA (US); Adam Morris-Cohen, Maynard, MA (US); John Goeltz, Carmel, CA (US); Steven Y. Reece, Cambridge, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 11 days.

(21) Appl. No.: 15/033,607

(22) PCT Filed: Oct. 31, 2014

(86) PCT No.: PCT/US2014/063290
§ 371 (c)(1),
(2) Date: Apr. 29, 2016

(87) PCT Pub. No.: WO2015/066398
PCT Pub. Date: May 7, 2015

(65) Prior Publication Data
US 2016/0293979 A1 Oct. 6, 2016

Related U.S. Application Data
(60) Provisional application No. 61/898,635, filed on Nov. 1, 2013.

(51) Int. Cl.
*H01M 8/04186* (2016.01)
*H01M 8/18* (2006.01)
(Continued)

(52) U.S. Cl.
CPC ......... *H01M 8/04194* (2013.01); *H01M 4/96* (2013.01); *H01M 8/0444* (2013.01);
(Continued)

(58) Field of Classification Search
CPC .... H01M 8/188; H01M 8/20; H01M 8/04194; H01M 4/96; H01M 8/04201;
(Continued)

(56) References Cited

U.S. PATENT DOCUMENTS 5,942,102 A * 8/1999 Hodges ................ C12Q 1/004
205/775
6,413,410 B1 * 7/2002 Hodges ................ C12Q 1/004
205/775
(Continued)

FOREIGN PATENT DOCUMENTS

CA 2236848 A1 5/1997
CA 2823963 A1 7/2012
(Continued)

OTHER PUBLICATIONS

Soloveichik, "Flow Batteries: Current Status and Trends," 2015, Chem. Rev., 115 (20), pp. 11533-11558.
(Continued)

*Primary Examiner* — Jonathan G Jelsma
*Assistant Examiner* — Omar M Kekia
(74) *Attorney, Agent, or Firm* — BakerHostetler

(57) ABSTRACT

The present invention relates to methods and apparatuses for determining the ratio of oxidized and reduced forms of a redox couple in solution, each method comprising: (a) contacting a first stationary working electrode and a first counter electrode to the solution; (b) applying a first potential at the first working electrode and measuring a first constant current; (c) applying a second potential at the first working electrode and measuring a second constant current;
(Continued)

wherein the sign of the first and second currents are not the same; and wherein the ratio of the absolute values of the first and second currents reflects the ratio of the oxidized and reduced forms of the redox couple in solution. When used in the context of monitoring/controlling electrochemical cells, additional embodiments include those further comprising (d) oxidizing or reducing the solution, so as to alter the balance of the oxidized and reduced forms of the redox couple in solution, to a degree dependent on the ratio of the absolute values of the first and second currents. These embodiments may be used in the context of maintaining an electrochemical cell, stack, or system.

34 Claims, 5 Drawing Sheets

(51) Int. Cl.
| | |
|---|---|
| *H01M 8/20* | (2006.01) |
| *H01M 4/96* | (2006.01) |
| *H01M 8/04082* | (2016.01) |
| *H01M 8/0444* | (2016.01) |
| *H01M 8/04791* | (2016.01) |
| *H01M 8/22* | (2006.01) |

(52) U.S. Cl.
CPC ... *H01M 8/04201* (2013.01); *H01M 8/04791* (2013.01); *H01M 8/188* (2013.01); *H01M 8/20* (2013.01); *H01M 8/222* (2013.01); *Y02E 60/528* (2013.01)

(58) Field of Classification Search
CPC .......... H01M 8/0444; H01M 8/04791; H01M 8/222; Y02E 60/528
USPC ........................................................... 429/51
See application file for complete search history.

(56) References Cited

U.S. PATENT DOCUMENTS

| | | | |
|---|---|---|---|
| 8,587,255 | B2 | 11/2013 | Parakulam et al. |
| 8,980,484 | B2 | 3/2015 | Chang et al. |
| 2003/0170906 | A1 | 9/2003 | Swain et al. |
| 2005/0158614 | A1 | 7/2005 | Hennessy |
| 2006/0049064 | A1 | 3/2006 | Horvath et al. |
| 2008/0060196 | A1* | 3/2008 | Wang ................. G01N 27/3272 29/854 |
| 2008/0193828 | A1* | 8/2008 | Sahu ..................... G01N 21/80 429/63 |
| 2008/0204708 | A1 | 8/2008 | Shaw |
| 2009/0026094 | A1* | 1/2009 | Deng ..................... C12Q 1/006 205/792 |
| 2010/0047671 | A1 | 2/2010 | Chiang et al. |
| 2010/0084288 | A1* | 4/2010 | Hodges ................. C12Q 1/004 205/787 |
| 2011/0048969 | A1* | 3/2011 | Lawrence ............. B82Y 30/00 205/775 |
| 2011/0081563 | A1 | 4/2011 | Christensen et al. |
| 2011/0086247 | A1 | 4/2011 | Keshavarz et al. |
| 2011/0223450 | A1 | 9/2011 | Horne et al. |
| 2012/0122130 | A1* | 5/2012 | Omura ................. C12N 9/0004 435/14 |
| 2012/0263986 | A1 | 10/2012 | Fulop et al. |
| 2013/0011702 | A1 | 1/2013 | Horne et al. |
| 2013/0029185 | A1 | 1/2013 | Ridley et al. |
| 2013/0084482 | A1 | 4/2013 | Chang et al. |
| 2013/0084506 | A1* | 4/2013 | Chang ................... H01M 8/188 429/400 |
| 2013/0095362 | A1 | 4/2013 | Keshavarz et al. |
| 2013/0157162 | A1 | 6/2013 | Dong et al. |
| 2013/0224538 | A1* | 8/2013 | Jansen ................. H01M 8/188 429/72 |
| 2013/0269566 | A1 | 10/2013 | Van Polen |
| 2014/0030631 | A1 | 1/2014 | Esswein et al. |
| 2014/0238875 | A1 | 8/2014 | Bekki et al. |
| 2014/0299014 | A1 | 10/2014 | Van Polen |
| 2016/0111740 | A1 | 4/2016 | Spaziante et al. |
| 2016/0164125 | A1 | 6/2016 | Pijpers |
| 2016/0254562 | A1 | 9/2016 | Morris-Cohen et al. |
| 2016/0293991 | A1 | 10/2016 | Goeltz et al. |
| 2016/0372777 | A1 | 12/2016 | Buckley et al. |

FOREIGN PATENT DOCUMENTS

| | | |
|---|---|---|
| CN | 1204400 A | 1/1999 |
| EP | 1998163 A1 | 12/2008 |
| EP | 2648258 A1 | 10/2013 |
| JP | 2005-526260 | 11/2003 |
| JP | 2004-336734 A | 11/2004 |
| JP | 2006-351346 A | 12/2006 |
| WO | WO-90/03666 A1 | 4/1990 |
| WO | WO 03/097861 | 11/2003 |
| WO | WO-2008/148148 A1 | 12/2008 |
| WO | WO-2010/118175 A2 | 10/2010 |
| WO | WO-2012/094674 A2 | 7/2012 |

OTHER PUBLICATIONS

International Search Report and Written Opinion from PCT/US16/65160, dated Feb. 17, 2017.
Extended European Search Report from European Patent Application No. 14862634.4, dated May 11, 2017.
Extended European Search Report from European Application No. 14858186.1, dated Apr. 26, 2017.
Mohamed et al., "Estimating the State-of-Charge of all-Vanadium Redox Flow Battery using a Divided, Open-circuit Potentiometric Cell," Elektronika IR Elektrotechnika, 2013, pp. 39-41, vol. 19.
International Search Report, and Written Opinion for PCT/US2014/063290 dated Jan. 30, 2015.
Corcuera, S., et al., "State-of montoring and electrolyte rebalancing methods for the vanadium redox flow battery," European Chemical Bulletin, 2012, pp. 511-519, 1.
Skyllas-Kazacos, M., et al., "State of charge monitoring methods for vanadium redox flow battery control," Journal of Power Science, 2011, pp. 8822-8827, 196.
Pop, V. et al., "State-of-the-art of battery state-of-charge determination," Measurement Science and Technology, 2005, pp. R93-R110, 16.
Extended European Search Report from European Patent Application No. 15868031.4, dated Jun. 7, 2018, 8 pages.

* cited by examiner

APPARATUS AND METHOD FOR DETERMINING STATE OF CHARGE IN A REDOX FLOW BATTERY VIA LIMITING CURRENTS

CROSS REFERENCE TO RELATED APPLICATIONS

This application is a 35 U.S.C. § 371 National Stage entry of International Patent Application PCT/US2014/063290, filed on Oct. 31, 2014, which claims the benefit of priority of U.S. Provisional Patent Application Ser. No. 61/898,635, filed on Nov. 1, 2013, the contents of each of which are incorporated by reference in their entirety for any and all purposes.

TECHNICAL FIELD

The present invention relates to redox flow batteries and methods and apparatuses for monitoring the compositions of the electrolytes therein.

BACKGROUND

Flow batteries are electrochemical energy storage systems in which electrochemical reactants, typically redox active compounds, are dissolved in liquid electrolytes, which are individually contained in negolyte and posolyte loops and circulated through reaction cells where electrical energy is either converted to or extracted from chemical potential energy in the reactants by way of reduction and oxidation reactions. Especially in larger systems, which may comprise multiple electrochemical cells or stacks, it is important to be able to monitor the state of charge of each of the electrolytes, for example to know when the flow battery is "full" or "empty" before actually realizing these end states.

Additionally, for optimal performance, the initial state of such a system provides that the negolyte and posolyte contain equimolar quantities of the redox active species and that the negolyte state of charge and posolyte state of charge are equivalent. But after the system has experienced some number of charge/discharge cycles, the posolyte and negolyte may become imbalanced because of side reactions during these operations—for example, generation of hydrogen or oxygen from water if overpotential conditions are breached—causing the imbalance and associated loss of performance.

An imbalanced state may be corrected by processing the electrolyte in a rebalancing cell. But before this can be done, it is necessary to assess the state of charge of the system and often the individual electrolytes. State of charge for flow batteries is a way of expressing the ratio of concentrations of charged to uncharged active material. State of charge monitoring for flow battery electrolyte has typically been done using spectroscopic methods or by potential measurements. Spectroscopic measurements typically rely on well-established spectroscopic methods, most often relying on a color change and measurement by UV-Visible spectroscopy. Electrochemical measurements are a more direct way to establish state of charge. Most of these methods are based on measuring the potential of the electrolyte solution, which may be related to the concentration ratio through the Nernst equation. Such potential measurements require a reference electrode which can be prone to potential drift and 'fouling' when in contact with electrolyte for extended periods, making it difficult to obtain the absolute potential of the solution relative to a defined standard. For certain electrolyte compositions the relationship between state of charge and potential may not be accurately described by the Nernst equation.

The present invention addresses some of these deficiencies.

SUMMARY

Certain embodiments provide methods of determining the ratio of oxidized and reduced forms of a redox couple in solution, each method comprising:
(a) contacting a first stationary working electrode and a first counter electrode to the solution;
(b) applying a first potential at the first working electrode and measuring a first constant current;
(c) applying a second potential at the first working electrode and measuring a second constant current;
wherein the sign of the first and second currents are not the same; and
wherein the ratio of the absolute values of the first and second currents reflects the ratio of the oxidized and reduced forms of the redox couple in solution. When used in the context of monitoring/controlling electrochemical cells, stacks, or systems, additional embodiments include those further comprising (d) oxidizing or reducing the solution, so as to alter the balance of the oxidized and reduced forms of the redox couple in solution, to a degree dependent on the ratio of the absolute values of the first and second currents.

In other embodiments, it is also possible to use two pairs of electrodes, operating in tandem to the same effect as the single pair configuration. Accordingly, additional embodiments provide methods of determining the ratio of the oxidized and reduced forms of a redox couple in solution, each method comprising:
(a) contacting a first stationary working electrode and a first counter electrode to the solution;
(b) contacting a second stationary working electrode and a second counter electrode to the solution;
(c) applying a first potential at the first working electrode relative to the first counter electrode and measuring a first constant current for the first working electrode;
(d) applying a second potential at the second working electrode relative to the second counter electrode and measuring a second constant current for the second working electrode;
wherein the first and second currents have opposite signs; and
wherein the ratio of the absolute values of the first and second currents reflects the ratio of the oxidized and reduced forms of the redox couple in solution. When used in the context of monitoring/controlling electrochemical cells, additional embodiments further comprises (e) oxidizing or reducing the solution, so as to alter the balance of the oxidized and reduced forms of the redox couple in solution, to a degree dependent on the ratio of the absolute values of the first and second currents.

The invention also teaches energy storage systems, each system comprising:
(a) a fluidic loop containing a first electrolyte solution and a separate fluidic loop containing a second electrolyte solution;
(b) at least one pair of electrodes each independently in fluidic contact with the first electrolyte solution or each of the first and second electrolyte solutions, each pair of electrodes consisting of a first stationary working electrode and a first counter electrode; and
(c) an optional control system, including a power source and sensors, associated with each pair of electrodes, said control system configured to be capable of applying first and second electric potentials at each of the first working electrodes relative to the first counter electrodes, and measuring the first and second currents associated with said electric potential; and (d) optional software capable of calculating the ratio of the absolute values of the first and second currents between each electrode pairs, which reflects the ratio of the oxidized and reduced forms of the redox couple in solution. Such energy systems may further comprise at least one rebalancing sub-system associated with each electrode pair.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
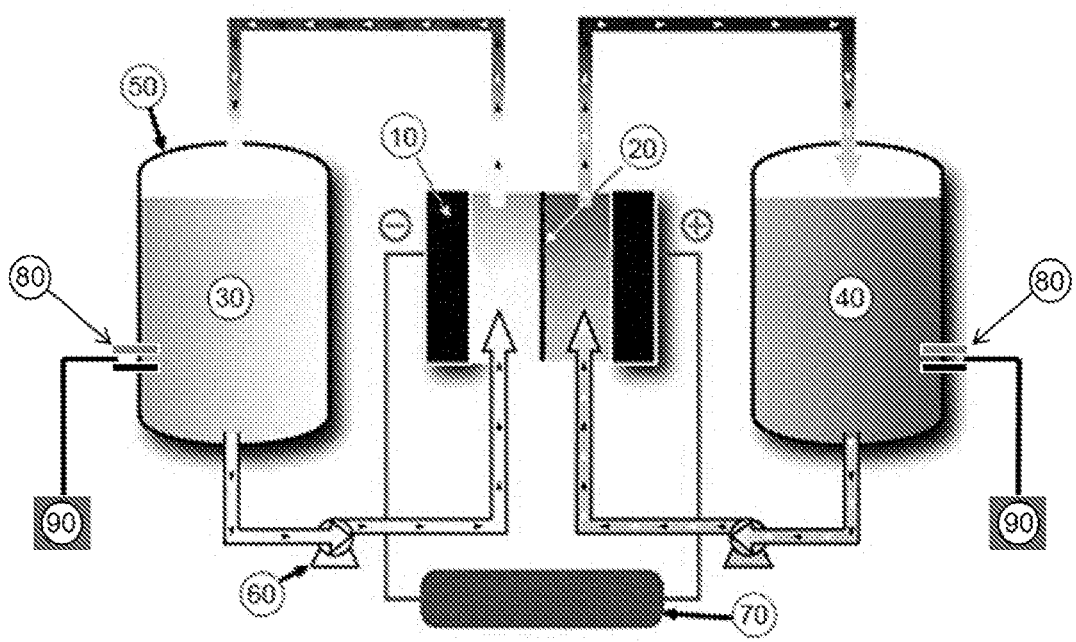
FIG. 1 provides a schematic representation of a redox flow battery incorporating a state of charge measurement apparatus.
Figure 2:
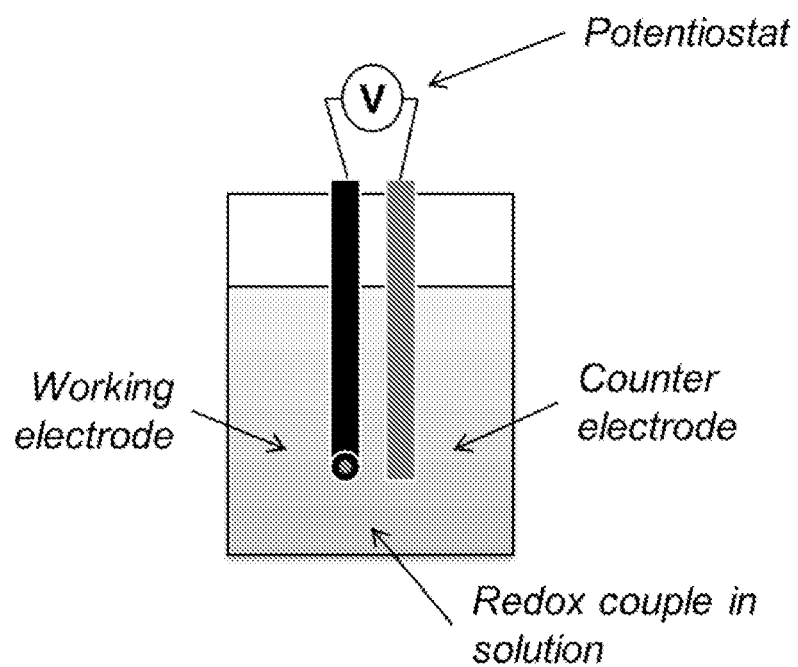
FIG. 2 describes one electrode configuration described herein.

The present invention relates to redox flow batteries and methods and apparatuses for monitoring the compositions of the electrolytes (posolyte or negolyte or both) therein. In particular, the present invention relates to methods and configurations whose use consists essentially of a first stationary working electrode and a first counter electrode (or two pairs of working and counter electrodes) to measure the ratio of oxidized and reduced forms of a redox couple, and so the state of charge of an electrolyte. The methods of this invention are based on the use of limiting current between a set of electrodes and do not rely on a reference electrode to measure or control potential. When used as part of a control and monitoring system for a redox flow battery (or other electrochemical device) as feedback for charge and discharge cycles and an indicator in any state of charge loss or imbalance that may occur during operation, this invention thereby allows the adjustment of the ratio or state of charge for optimal performance of the electrochemical device.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

The following descriptions are believed to be helpful in understanding the present invention(s). Starting from first principles, an electrolyte in a flow battery consists of an active material which can store electrons; the active material thus exists in both a charged state and a discharged (or uncharged) state. If all the active material is discharged the electrolyte is said to have a state of charge of 0%, conversely, if all the active material is in the charged state the state of charge is 100%. At any intermediate state of charge (0%<SOC<100%) there will be a non-zero concentration of both charged active material and discharged active material. When current is passed through an electrode in contact with such an electrolyte molecules of the active material will either charge or discharge depending on the potential of the electrode. For an electrode of finite area the limiting current density ($i_{limiting}$) will be proportional to the concentration of the species being consumed by the electrochemical process.

For example if an active material at 50% SOC has an equilibrium potential of 0 V, and an electrode is held at +100 mV, discharged active material will be converted to charged active material and a current for this oxidation can be measured at the electrode. Assuming the volume and concentration of the active material is large the SOC will not change significantly, and the current will approach a constant value after the voltage has been held for a short time. This limiting current density ($i_{lim}$, current per unit electrode surface area) depends on the bulk concentration (C) of the discharged active material (the species being depleted), the diffusion coefficient (D) of the discharged active material, the thickness of the diffusion layer ($\delta$), and the number of electrons (n) transferred in the reaction according to the following equation:

$$i_{lim} = \frac{nFD}{\delta}C$$

Thus if the diffusion coefficient and diffusion layer thickness are known the concentration of charged active material or discharged active material can be directly determined by measuring the limiting current during oxidative or reductive traversal of the electrochemical couple. In practice precise determination of D and $\delta$ are non-trivial, so this invention will rely only on determining the concentration ratio of the charged active material to discharged active material by measuring the ratio of limiting currents for the oxidative and reductive process.

For a reversible electrochemical couple there is minimal structural or chemical change between the charged and discharged molecular species (for quasi-reversible or less reversible electrochemical couples, the same principles are in play, albeit with increasing associated errors. In some applications, these increasing errors may be acceptable or correctable, so as to allow the present methods to be used with these systems as well). This means that for the oxidative process (ox) and reductive process (red), the diffusion coefficients and diffusion layer thickness will be similar for both processes, i.e. $D_{ox} \approx D_{red}$ and $\delta_{ox} \approx \delta_{red}$. Faraday's constant and the number of electrons will be unchanged such that:

$$\frac{i_{lim,ox}}{i_{lim,red}} \propto A \frac{C_{red}}{C_{ox}}$$

where A can either be unity (in the ideal case) or a correction constant to account for differences in the diffusion coefficient or diffusion layer as determined experimentally by other methods. $C_{ox}$ is the concentration of the oxidized form of the active material (depleted upon reduction), and $C_{red}$ is the concentration of the reduced form of the active material (depleted upon oxidation). The ratio of concentrations (or limiting currents) can be easily converted to SOC as a percentage:

$$SOC = 100 \frac{\frac{C_{ox}}{C_{red}}}{1 + \frac{C_{ox}}{C_{red}}} = 100 \frac{A \frac{i_{lim,red}}{i_{lim,ox}}}{1 + A \frac{i_{lim,red}}{i_{lim,ox}}}$$

Despite the apparent simplicity of this approach, it does not appear that these relationships have been recognized or applied by those skilled in the art of electrochemistry to flow battery systems.

In practice, the above equations represent an ideal case, and the ratio of currents may need to be related to the state of charge in a more empirical fashion. In the case of using multiple sets of electrodes the surface areas of the working electrodes may be selected such that they are not equivalent, in which case the ratio of currents and the ratio of current densities would be inequivalent ($I_{ox}/I_{red} \neq i_{ox}/i_{red}$). Additionally the diffusion coefficients and diffusion layer thicknesses for the oxidized and reduced species, though similar, will not be equivalent. In some embodiments the potential holds chosen may be such that the difference between the oxidative hold and $E_{1/2}$ and the difference between the reductive hold and $E_{1/2}$ are not the same magnitude, such that even with no change in diffusion characteristics ($D_{ox}=D_{red}$ and $\delta_{ox}=\delta_{ox}$) the proportionality constant A may be significantly different from unity.

These factors can be accounted for by calibrating the limiting current technique across the state of charge range. For example the oxidative and reductive currents for a particular mode of operation (surface areas, potential magnitudes, etc.) would be measured at multiple SOC's. The state of charge could be independently measured by another technique such as spectroscopy or charge counting. The current ratio $I_{ox}/I_{red}$ could then be related to $C_{ox}/C_{red}$ determined from the independent method via a proportionality constant (i.e. A in the above equations) or by a more complex formula. Alternatively $I_{ox}/I_{red}$ could be immediately converted to a 'raw' SOC by making no such correction, but then subsequently the 'raw' SOC could be related to the independently measured SOC to give the appropriate correction factor or formula.

The limiting current for either the oxidative or reductive process can be measured by a simple three electrode experiment (working, counter, and reference). For example if the $E_{1/2}$ for an electrolyte couple is 0 V vs. $Ag^+/Ag^0$ the working electrode could be held at +100 mV vs. $Ag^+/Ag^0$, and the current measured vs. time. After a short time the current would reach a near constant value which would establish the limiting oxidative current $I_{lim,ox}$. Repeating the experiment at −100 mV vs. $Ag^+/Ag^0$ would establish the limiting reductive current $I_{lim,red}$. If the same electrode were used in each experiment the surface area would be the same and the current ratio would be equivalent to the current density ratio from which the concentration ratio could be determined.

However, a reference electrode is not required to obtain similar information. When a third reference electrode is not employed, the first and second potentials at the first working electrode are generally applied relative to the first counter electrode; the potential is held relative to the solution potential measured at the counter electrode. In this scenario any electrolyte couple has a potential of 0 V vs. solution potential, and the working electrode can be held at either positive or negative potential vs. that solution potential (e.g., +100 mV for the oxidation, or −100 mV for the reduction). Again the limiting current can be measured once it becomes constant or near constant.

With this background, it is possible to enumerate at least some of the many embodiments of the present invention.

Certain embodiments provide methods of determining the ratio of oxidized and reduced forms of a redox couple in solution, each method comprising:
(a) contacting a first stationary working electrode and a first counter electrode to the solution;
(b) applying a first potential at the first working electrode and measuring a first constant current;
(c) applying a second potential at the first working electrode and measuring a second constant current;
wherein the sign of the first and second currents are not the same; and
wherein the ratio of the absolute values of the first and second currents reflects the ratio of the oxidized and reduced forms of the redox couple in solution, according to the equations described above. This ratio may be used simply to monitor an electrochemical cell either at various intervals or in real-time, so as to know when to adjust the current inputs or outputs from said system. Alternatively, when such methods are individually applied to both of the posolyte and negolyte of an electrochemical, a comparison of the ratios may be used as a basis for determining the need for rebalancing either or both of the electrolytes. For example, additional embodiments include those comprising the steps already described in this paragraph, and further comprising (d) oxidizing or reducing the solution, so as to alter the balance of the oxidized and reduced forms of the redox couple in solution, to a degree dependent on the ratio of the absolute values of the first and second currents. These embodiments may be used in the context of maintaining an electrochemical cell, stack, or system.

Whether described as methods of determining the ratio of oxidized and reduced forms of a redox couple in solution or methods of maintaining an electrochemical cell, stack, or system, in certain of these methods employing a first stationary working electrode and a first counter electrode, the methods may be conducted in the absence or presence of a third (reference) electrode. That is, use of a reference or third electrode is not necessarily required.

The methods may be conducted such that the first potential is more positive than the equilibrium potential of the redox couple; and the second potential is more negative than the equilibrium potential of the redox couple. In other sometimes overlapping embodiments, the magnitude of the difference between the first potential and the equilibrium potential and the magnitude of the difference between the equilibrium potential and the second potential are substantially the same. These methods may be done such that the first and second potentials may be, but are not necessarily, of substantially the same magnitude but opposite in sign. As used herein in the context of potential differences, the term "substantially the same" is intended to connote a difference of less than about 20%, relative to the mean of the two values. In practice, the user will likely seek to achieve near parity of magnitudes, as much as practicably possible, but additional provide that this difference is less than 25%, 15%, 10%, or 5%, relative to the mean value of the two potentials.

The working and counter electrodes are typically, but not necessarily, differently sized, for example, such that the first working and counter electrodes each has a surface area contacting the solution, and the surface area of the working electrode is less than that of the counter electrode. Such an arrangement encourages the limiting of the current to be at the working electrode. Without being bound by the correctness or incorrectness of any particular theory, it is believed that if the counter electrode becomes smaller (relative to the working electrode) the current will then be limited at the counter and not the working electrode, the sign of the currents will still be set by the sign of the potential, but the magnitude will now be controlled by reactions at the counter which is the opposite direction of the reaction occurring at the working electrode. The calculations may be adjusted for this difference, so long as it is appreciated (i.e., in such circumstances, the roles of the working and counter electrodes have been reversed). Using a larger size ratio avoids any confusion or contribution of effects at both electrodes. In certain preferred embodiments, the surface area of the first working electrode is less than about 20%, more preferably in a range of about 1% to 10%, of that of the first counter electrode, through additional embodiments provide that the surface area of the first working electrode may be from about 5%, 10%, 20%, 30%, 40%, or 50% to about 90%, 80%, 70%, 60%, or 50% of the first counter electrode.

In other embodiments, it is also possible to use two pairs of electrodes, operating in tandem to the same effect as the single pair configuration. That is, certain embodiments provide methods of determining the ratio of the oxidized and reduced forms of a redox couple in solution, each method comprising:
(a) contacting a first stationary working electrode and a first counter electrode to the solution;
(b) contacting a second stationary working electrode and a second counter electrode to the solution;
(c) applying a first potential at the first working electrode relative to the first counter electrode and measuring a first constant current for the first working electrode;
(d) applying a second potential at the second working electrode relative to the second counter electrode and measuring a second constant current for the second working electrode;
wherein the first and second currents have opposite signs; and
wherein the ratio of the absolute values of the first and second currents reflects the ratio of the oxidized and reduced forms of the redox couple in solution. Analogous to the single electrode pair arrangement, this ratio may be used simply to monitor an electrochemical cell either at various intervals or in real-time, so as to know when to adjust the current inputs or outputs from said system. Alternatively, when such methods are individually applied to both of the posolytes and negolytes of an electrochemical, a comparison of the ratios may be used as a basis for determining the need for rebalancing either or both of the electrolytes. For example, additional embodiments include those comprising the steps already described in this paragraph, and further comprising (e) oxidizing or reducing the solution, so as to alter the balance of the oxidized and reduced forms of the redox couple in solution, to a degree dependent on the ratio of the absolute values of the first and second currents. These embodiments may be also be used in the context of maintaining an electrochemical cell, stack, or system. In the case of these twin pair electrode arrangements, the first and second potentials are applied at each electrode pair at the same time (simultaneously) or at staggered times.

Whether described as methods of determining the ratio of oxidized and reduced forms of a redox couple in solution or methods of maintaining an electrochemical cell, stack, or system, in certain of these methods employing twin pairs of stationary working electrodes and counter electrodes, the methods may be conducted in the absence or presence of third (reference) electrodes. That is, use of a reference or third electrode is not necessarily required. When a third reference electrode is not employed, the first and second potentials at the first working electrode are generally applied relative to the respective counter electrode.

The terms "twin pairs" or "matched pairs" of stationary working electrodes and counter electrodes is not intended to connote that the respective electrodes are necessarily of identical or complementary sizes, or that the first working electrode only works with the first counter electrode and that the second working electrode only works with the second counter electrode, though in fact either of these conditions may be true. Rather, the terms are intended to connote that two sets of similarly sized electrodes are present and used, alternatively if sets of differently sized electrodes are used this difference may need to be appreciated and adjusted for in calculation. However, in preferred embodiments where so-called twin pairs of electrodes are used, the working and counter electrode of each pair are positioned to be spatially close to one another, while each pair are positioned to be spatially separated to prevent cross currents. One pair would be polarized to a positive potential to measure the oxidative limiting current, and one pair would be polarized negatively to measure the reductive limiting current.

Such a device would hold each pair of electrodes at the appropriate potentials and measure the current through each loop. The ratio of the limiting currents can be directly displayed or recorded and will be equivalent, or practically equivalent provided equal or near equal working electrode surface areas, to the ratio of the limiting/constant current densities and equivalent (or proportional) to the concentration ratio. Concerns about the electrode surface area changing over time can be alleviated by periodically switching which pair was measuring the reductive process and which the oxidative process, such that any change in surface area (as a result of electrode fouling) would occur evenly on both electrodes. The invention also extends to a device capable of acting as a simple potentiostat to hold each pair of electrodes at constant potential and measure the resulting current, and a simple algorithm to compute the ratio of the currents and convert it to concentrations or states of charge based on other user inputs.

In certain embodiments, where the first and second working electrodes and the first and second counter electrodes each have a surface contacting the solution, each of the first and second working electrode surface areas may be less than the respective or individual areas of the first and second counter electrodes, such that the current response is be determined only or predominantly by limiting (constant) current densities of the working electrodes. In other embodiments, sometimes overlapping, each surface area of the first and second working electrodes is substantially the same and each of the first and second counter electrodes is substantially the same. The term "substantially the same" in this context refers to areas within about 10% of one another. In practice, one would probably just use two similarly sized (e.g., same model number) working electrodes as manufactured. As significant variances in size would provide for a significant source of error, the skilled artisan would likely look for electrodes in which the difference in areas to be close to or within the manufacturer's specification for the stated area of the electrode.

As in the single electrode pair arrangement, the relative surface areas of the working and counter electrodes may be configured such that, in certain preferred embodiments the surface areas of the first and second working electrodes are each less than about 20%, more preferably in a range of about 1% to about 10%, of the surface areas of the first and second counter electrodes, respectively, through additional embodiments provide that the surface area of the working electrodes may be from about 5%, 10%, 20%, 30%, 40%, or 50% to about 90%, 80%, 70%, 60%, or 50% of the respective counter electrodes.

As with the single pair systems, the methods employing twin pairs of electrodes may be conducted such that the first potential is more positive than the equilibrium potential of the redox couple; and the second potential is more negative than the equilibrium potential of the redox couple. In other embodiments, sometimes overlapping, the magnitude of the difference between the first potential and the equilibrium potential and the magnitude of the difference between the equilibrium potential and the second potential are substantially the same. These methods may be done such that the first and second potentials may be, but are not necessarily, of substantially the same magnitude but opposite in sign.

Whether using one or two pair electrode systems, additional individual embodiments provide that the ratio of the oxidized and reduced forms of the redox couple are in a range of from about 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, or about 99:1. In preferred embodiments, the ratio of the oxidized and reduced forms of the redox couple are in a range of from about 20:80 to about 80:20.

The methods are flexible in their utility with a range of redox couples and electrolytes, including those couples comprising a metal or metalloid of Groups 2-16, including the lanthanide and actinide elements; for example, including those where the redox couple comprises Al, As, Ca, Ce, Co, Cr, Cu, Fe, Mg, Mn, Mo, Ni, Sb, Se, Si, Sn, Ti, V, W, Zn, or Zr, including coordination compounds of the same, and either with aqueous or non-aqueous electrolyte solutions. Additionally, the methods are useful in flowing or static electrolytes. In such cases, it is highly preferred that the voltages applied are appropriate or the local flow around the working electrode(s) is low enough to allow the limiting current to be reached.

For reasons described above, the methods are particularly suited for use with reversible redox couples, but may also be used with quasi-reversible couples.

Additionally, the methods are flexible in their choice of electrode materials, though in certain preferred embodiments, at least one of the working electrodes or counter electrodes comprises an allotrope of carbon, including doped forms of carbon, more preferably comprising graphite or diamond.

The methods have been described thus far in terms of first and second constant currents. This constant current can be calculated from analysis of a current vs. time plot. In preferred embodiments, reference to "constant currents" refer to stable, limiting currents which establish after extended application (e.g., one minute) of the respective first and second potentials. However, for the sake of clarity, the constancy of at least one of the first or second current may also be characterized as exhibiting a change of less than 0.1% over one second or by a change of less than 1% over ten seconds. In other embodiments, constancy of current may also refer to less than 5%, 2%, 1%, 0.5%, or 0.1% over periods of 1, 2, 5, 10, 20, or 60 seconds. Obviously, lesser changes over longer times are more likely to reflect more stable and useful results.

Because these methods are useful in any application where it is not necessary to quantify individual oxidized and reduced forms of a redox couple, for example where the absolute concentration of the couple is fixed and only the ratio of the forms is changing, the methods are particularly suited for use in flow battery systems, wherein the solution is contained within a half-cell fluidic loop of an operating electrochemical cell (for example an operating flow battery cell or loop), said operating electrochemical cell generating or storing electrical energy. In those methods described above as comprising oxidizing or reducing the solution, so as to alter the balance of the oxidized and reduced forms of the redox couple in solution, to a degree dependent on the ratio of the absolute values of the first and second currents, additional embodiments provide that this be done electrochemically. In other embodiments, this may be accomplished by the addition of chemical oxidizing or reducing agents. Where done electrochemically, the oxidizing or reducing of the solution may be done in a rebalancing sub-system, for example, in cases where the state of charge of the negolyte and state of charge of the posolyte were different from one another or from the desired state. In other embodiments, for driving the storage or retrieval of energy, the state of charge monitor can be used as the control for rate, step times, stopping times, and other operational features, in which case the electrochemical method may be done by the main flow battery cell, stack, or system.

To this point, the invention has been described in terms of methods of determining the ratio of oxidized and reduced forms of a redox couple in solution or methods of maintaining the balance in electrochemical systems, but it should be appreciated that other embodiments include those systems and associated characteristics useful in employing these methods. That is, certain other embodiments provide energy storage systems, each system comprising:

(a) a fluidic loop containing a first electrolyte solution and a separate fluidic loop containing a second electrolyte solution; and (b) at least one pair of electrodes each independently in fluidic contact with the first electrolyte solution or each of the first and second electrolyte solutions, each pair of electrodes consisting of a first stationary working electrode and a first counter electrode. These electrolyte solutions and electrodes may comprise any of the characteristics and configurations described above for the methods.

Other embodiments provide that the energy storage system further comprises (c) a control system, including a power source and sensors, associated with each pair of electrodes, said control system configured to be capable of applying first and second electric potentials at each of the first working electrodes relative to the first counter electrodes, and measuring the first and second currents associated with said electric potential.

Still further embodiments provide that the energy storage system still further comprises: (d) software capable of calculating the ratio of the absolute values of the first and second currents between each electrode pairs, which reflects the ratio of the oxidized and reduced forms of the redox couple in solution.

In additional embodiments, the energy storage system even further comprises at least one rebalancing sub-system associated with each electrode pair, said rebalancing system in fluid communication with the first electrolyte loop or with each of the first and second electrolyte loops, said rebalancing sub-system controllable by the control system to oxidize or reduce the electrolyte solution(s) in the respective rebalancing sub-system in response to the calculated ratio of the absolute values of the first and second currents between each electrode pairs.

In any one of the embodiments, the first electrolyte solution may be a posolyte solution and the second electrolyte solution may be a negolyte solution. In other embodiments, the nature of the electrolytes is reversed, such that the first electrolyte solution is a negolyte solution and the second electrolyte solution is a posolyte solution.

More broadly, the device is not limited to energy storage/releasing systems, and certain embodiments provide for devices, each device comprising:

(a) at least one pair of electrodes that can each independently be in fluidic contact with an electrolyte solution, each pair of electrodes consisting of a first stationary working electrode and a first counter electrode; and (b) a control system, including a power source and sensors, associated with each pair of electrodes, said control system configured to be capable of applying first and second electric potentials at each of the first working electrodes relative to the first counter electrodes, and measuring the first and second currents associated with said electric potential; and (c) software capable of calculating the ratio of the absolute values of the first and second currents between each electrode pairs, which reflects the ratio of the oxidized and reduced forms of the redox couple in solution.

Terms

Throughout this specification, words are to be afforded their normal meaning, as would be understood by those skilled in the relevant art. However, so as to avoid misunderstanding, the meanings of certain terms will be specifically defined or clarified.

As used herein, the term "redox couple" is a term of the art generally recognized by the skilled electrochemist and refers to the oxidized (electron acceptor) and the reduced (electron donor) forms of the species of a given redox reaction. The pair $Fe(CN)_6^{3+}/Fe(CN)_6^{4+}$ is but one, non-limiting, example of a redox couple. Similarly, the term "redox active metal ion" is intended to connote that the metal undergoes a change in oxidation state under the conditions of use. As used herein, the term "redox couple" may refer to pairs of organic or inorganic materials. As described herein, inorganic materials may include "metal ligand coordination compounds" or simply "coordination compounds" which are also known to those skilled in the art of electrochemistry and inorganic chemistry. A (metal ligand) coordination compound may comprise a metal ion bonded to an atom, molecule, or ion. The bonded atom or molecule is referred to as a "ligand". In certain non-limiting embodiments, the ligand may comprise a molecule comprising C, H, N, and/or O atoms. In other words, the ligand may comprise an organic molecule or ion. In some embodiments of the present inventions, the coordination compounds comprise at least one ligand that is not water, hydroxide, or a halide (F$^-$, Cl$^-$, Br$^-$, I$^-$), though the invention is not limited to these embodiments. Additional embodiments include those metal ligand coordination compounds described in U.S. patent application Ser. No. 13/948,497, filed Jul. 23, 2013, which is incorporated by reference herein in its entirety at least for its teaching of coordination compounds Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55 wt %, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species. Unless otherwise specified, the term "non-aqueous" refers to a solvent system comprising less than 10% by weight of water, generally comprising at least one organic solvent. Additional independent embodiments include those where the "non-aqueous" solvent system comprises less than 50 wt %, less than 40 wt %, less than 30 wt %, less than 20 wt %, less than 10%, less than 5 wt %, or less than 2 wt % water, relative to the total solvent.

In addition to the redox active materials, an aqueous electrolyte may contain additional buffering agents, supporting electrolytes, viscosity modifiers, wetting agents, and the like.

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode. The negative electrode is associated with the first aqueous electrolyte and the positive electrode is associated with the second electrolyte, as described herein.

The terms "negolyte" and "posolyte," as used herein, refer to the electrolytes associated with the negative electrode and positive electrodes, respectively.

As used herein, unless otherwise specified, the term "substantially reversible couples" refers to those redox pairs wherein the voltage difference between the anodic and cathodic peaks is less than about 0.3 V, as measured by cyclic voltammetry, using an ex-situ apparatus comprising a flat glassy carbon disc electrode and recording at 100 mV/s. However, additional embodiments provide that this term may also refer to those redox pairs wherein the voltage difference between the anodic and cathodic peaks is less than about 0.2 V, less than about 0.1 V, less than about 0.075 V, or less than about 0.059 V, under these same testing conditions. The term "quasi-reversible couple" refers to a redox pair where the corresponding voltage difference between the anodic and cathodic peaks is in a range of from 0.3 V to about 1 V.

The term "stack" or "cell stack" or "electrochemical cell stack" refers to a collection of individual electrochemical cells that are electrically connected. The cells may be electrically connected in series or in parallel. The cells may or may not be fluidly connected.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$) by the equation:

$$SOC = 100 \frac{\frac{C_{ox}}{C_{red}}}{1 + \frac{C_{ox}}{C_{red}}} = 100 \frac{A \frac{i_{lim,red}}{i_{lim,ox}}}{1 + A \frac{i_{lim,red}}{i_{lim,ox}}}$$

where A=1 in ideal cases. For example, in the case of an individual half-cell, when $X_{red}=X_{ox}$ such that $X_{red}/X_{ox}=1$, the half-cell is at 50% SOC, and the half-cell potential equals the standard Nernstian value, E°. When the concentration ratio at the electrode surface corresponds to $X_{red}/X_{ox}=0.25$ or $X_{red}/X_{ox}=0.75$, the half-cell is at 25% and 75% SOC respectively. The SOC for a full cell depends on the SOCs of the individual half-cells and in certain embodiments the SOC is the same for both positive and negative electrodes.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Three samples of the redox couple iron(III) hexacyanide/iron(II) hexacyanide were prepared with three distinct ratios of the oxidized ($Fe^{3+}$) to reduced ($Fe^{2+}$) species. The samples were prepared by the dissolution of the potassium salts $K_4Fe(CN)_6$ and $K_3Fe(CN)_6$ in the appropriate molar ratios 20% $Fe^{3+}$/80% $Fe^{2+}$, 60% $Fe^{3+}$/40% Fe, and 95% $Fe^{3+}$/5% $Fe^{2+}$. The total concentration of iron in each sample was 1.0 M. In each case the state of charge (SOC) of each solution was defined to be the percentage of the $Fe^{3+}$ species.

A 0.3 cm diameter glassy carbon disc working electrode (Bioanalytical Systems, Inc.), with a surface area of 0.071 cm$^2$, and a 0.4 cm glassy carbon rod (Alfa Aesar) with a surface area of approximately 5 cm$^2$ were placed into contact with each solution and connected to a potentiostat. The glassy carbon rod was connected as both the counter and reference electrode.

Figure 3:
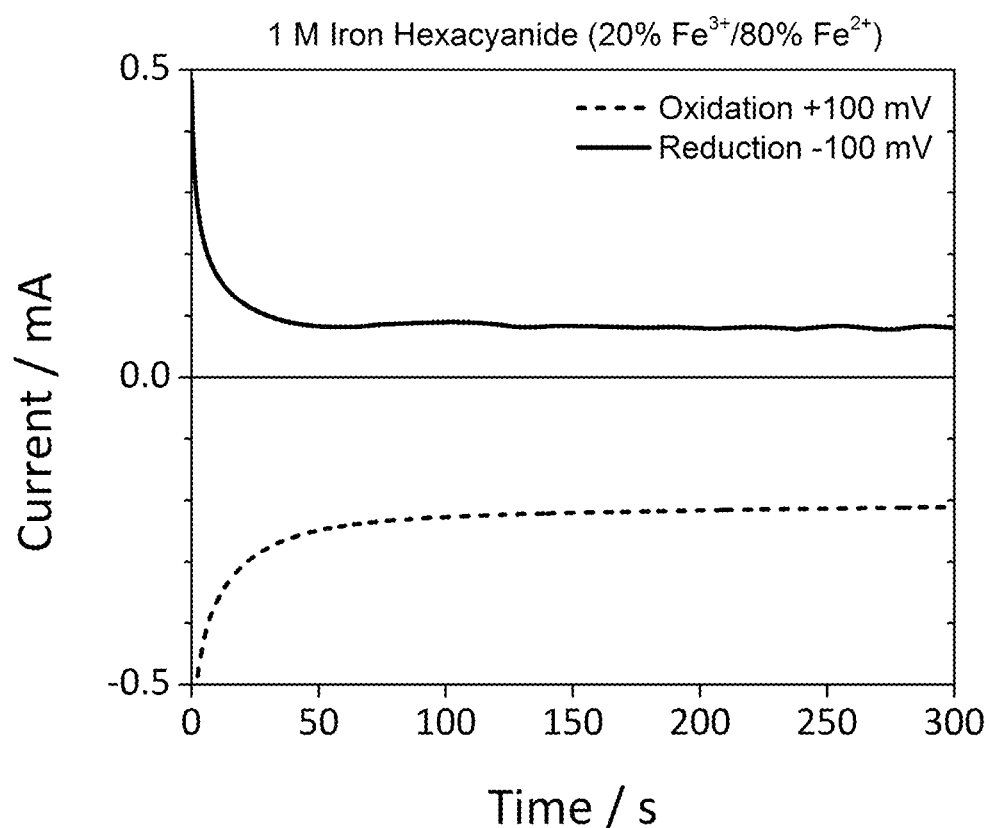
FIG. 3 shows the relationship of current as a function of time for the oxidation and reduction of 1 M iron hexacyanide at 20 mol % $Fe^{3+}$/80 mol % $Fe^{2+}$ using glassy carbon electrodes, as described in Example 1.
Figure 4:
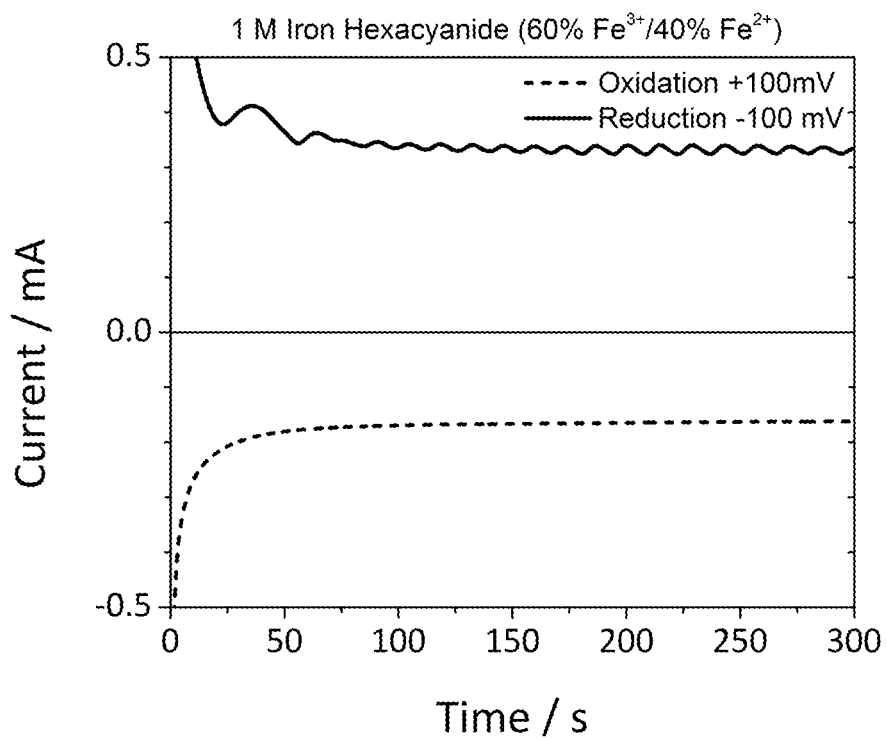
FIG. 4 shows the relationship of current as a function of time for the oxidation and reduction of 1 M iron hexacyanide at 60 mol % $Fe^{3+}$/40 mol % $Fe^{2+}$ using glassy carbon electrodes, as described in Example 1.
Figure 5:
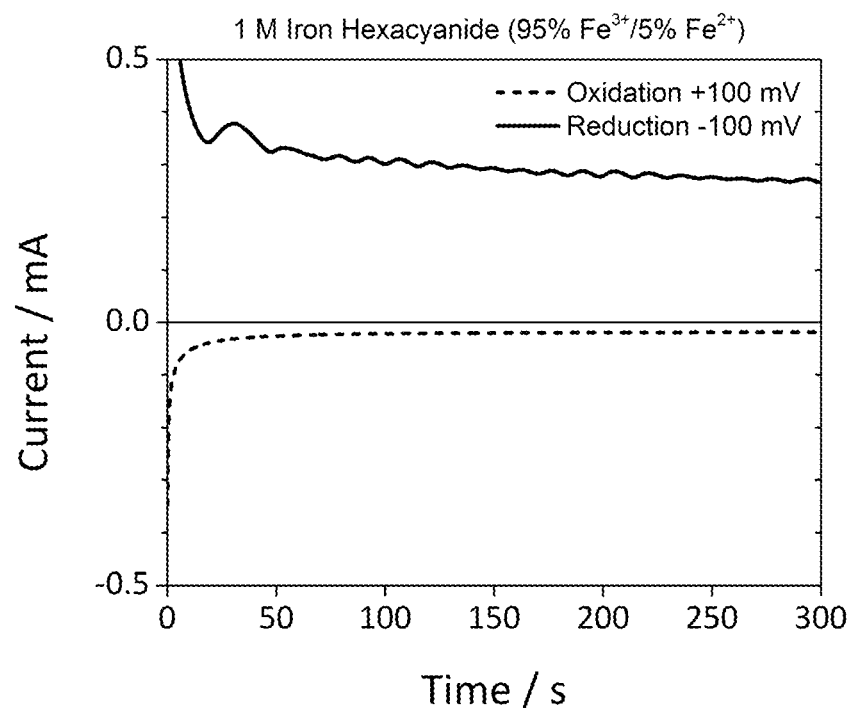
FIG. 5 shows the relationship of current as a function of time for the oxidation and reduction of 1 M iron hexacyanide at 95 mol % $Fe^{3+}$/5 mol % $Fe^{2+}$ using glassy carbon electrodes, as described in Example 1.
Figure 6:
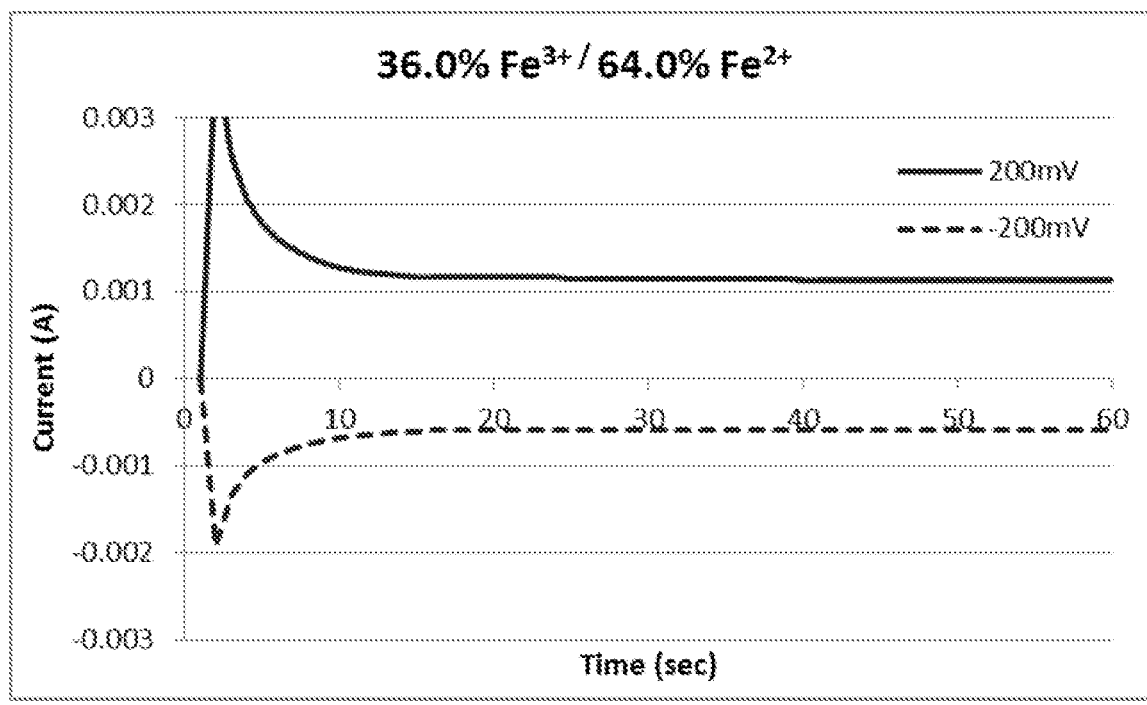
FIG. 6 shows the relationship of current as a function of time for the oxidation and reduction of 0.92 M iron hexacyanide at 36 mol % $Fe^{3+}$/64 mol % $Fe^{2+}$ using glassy carbon electrodes, as described in Example 2.
Figure 7:
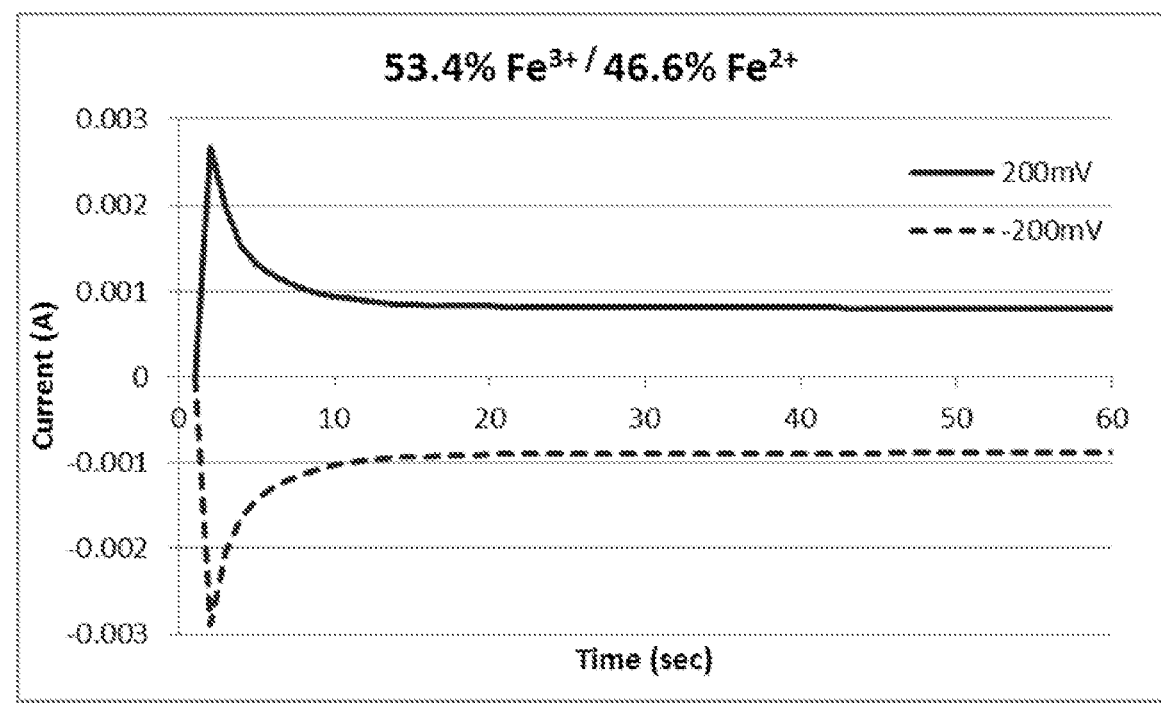
FIG. 7 shows the relationship of current as a function of time for the oxidation and reduction of 0.92 M iron hexacyanide at 53.4 mol % $Fe^{3+}$/46.6 mol % $Fe^{2+}$ using glassy carbon electrodes, as described in Example 2.
Figure 8:
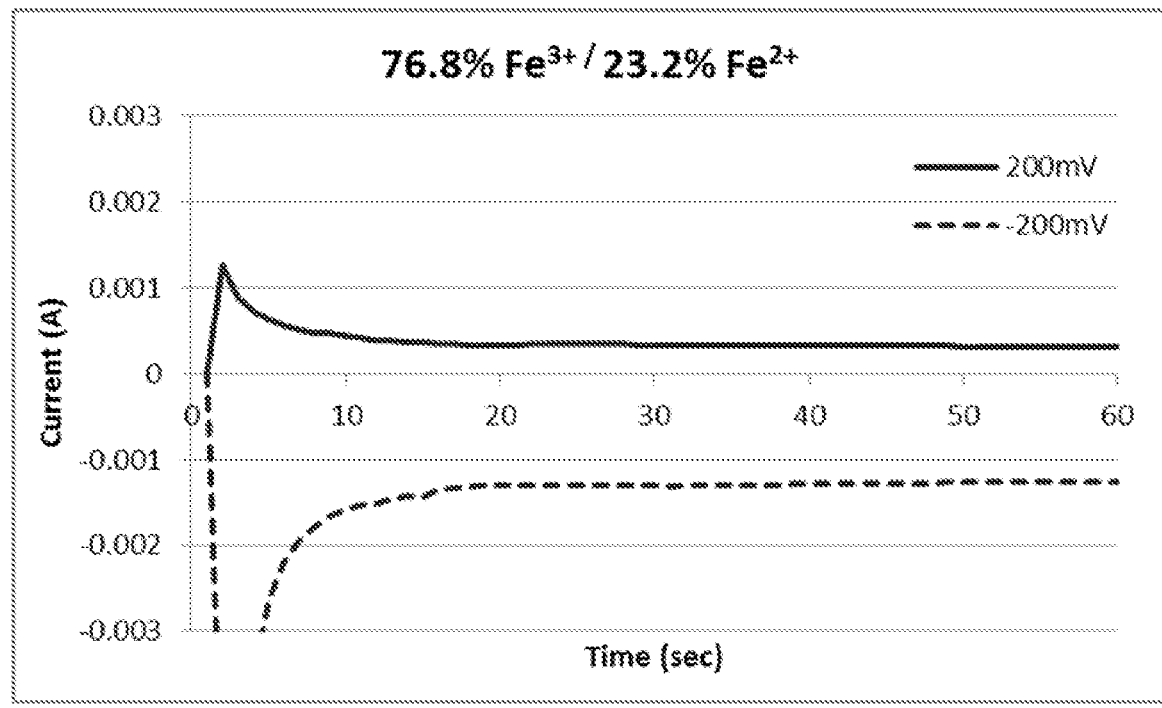
FIG. 8 shows the relationship of current as a function of time for the oxidation and reduction of 0.92 M iron hexacyanide at 76.8 mol % $Fe^{3+}$/23.2 mol % $Fe^{2+}$ using glassy carbon electrodes, as described in Example 2.
Figure 9:
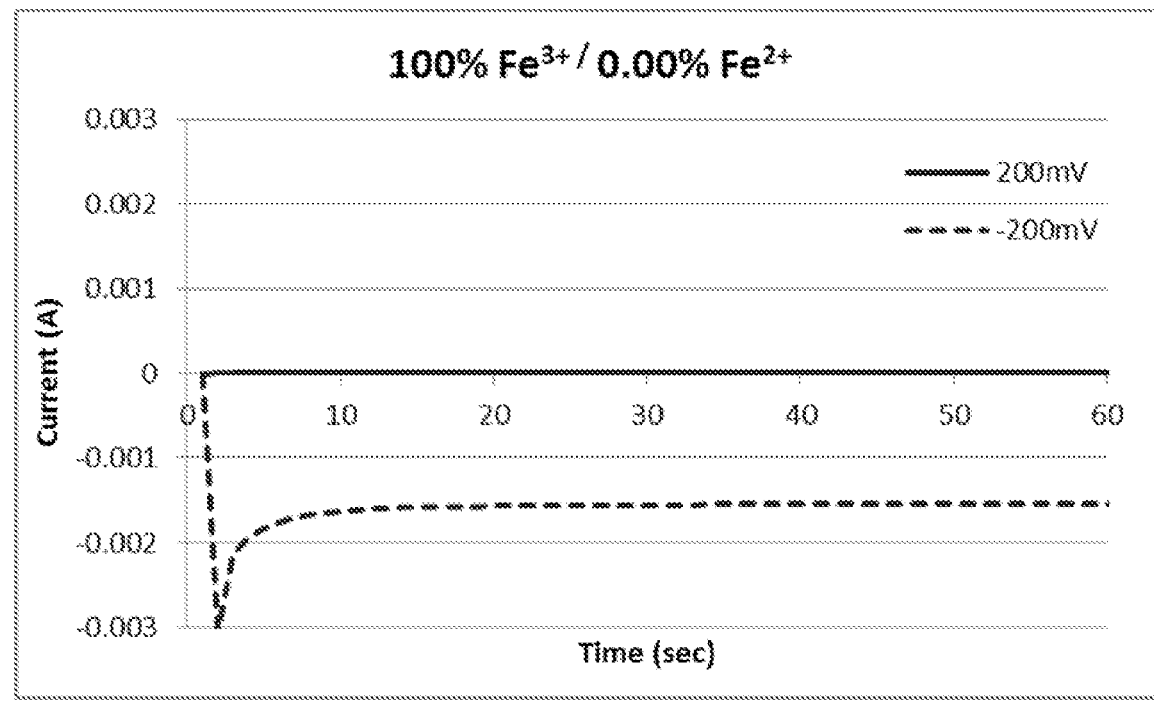
FIG. 9 shows the relationship of current as a function of time for the oxidation and reduction of 0.92 M iron hexacyanide at 100 mol % $Fe^{3+}$/0 mol % $Fe^{2+}$ using glassy carbon electrodes, as described in Example 2.

For each sample, the potential of the working electrode was set to +0.1 V and held for 300 s while recording the current ($I_{lim,ox}$). Subsequently the potential was set to −0.1 V and held for 300 s while recording the current ($I_{lim,red}$). Measurements were taken without stirring of the solutions. The resulting currents are plotted in FIGS. 3, 4, and 5. The current at 300 s was taken to be the constant current for each hold. The oscillation present in the current for the negative potential holds is attributed to a limitation of the potentiostat, and not inherent to limiting current behavior at the electrode or in the electrolyte. The measured constant currents, ratio of the currents, and the resulting SOC (or % $Fe^{3+}$) are listed in Table 1. The SOC was calculated using:

$$SOC = 100 \frac{A \frac{I_{lim,red}}{I_{lim,ox}}}{1 + A \frac{I_{lim,red}}{I_{lim,ox}}}$$

with the coefficient A taken to be 1.

TABLE 1

Limiting Currents and SOC for $Fe^{3+}/Fe^{2+}$ Samples - Example 1

| Calculated (as prepared) | | Experimental | | | SOC |
|---|---|---|---|---|---|
| SOC (% $Fe^{3+}$) | $I_{red}/I_{ox}$ | $I_{lim, ox}$ | $I_{lim, red}$ | $I_{red}/I_{ox}$ | (% $Fe^{3+}$) |
| 20 | 0.25 | −0.21 mA | 0.08 mA | 0.38 | 27 |
| 60 | 1.5 | −0.16 mA | 0.32 mA | 2.0 | 67 |
| 95 | 19 | −0.02 mA | 0.27 mA | 14 | 93 |

Example 2

Four additional samples of the redox couple iron(III) hexacyanide/iron(II) hexacyanide were prepared as described in Example 1, with molar ratios 36.0% $Fe^{3+}$/64.0% $Fe^{2+}$, 53.4% $Fe^{3+}$/46.6% Fe, 76.8% $Fe^{3+}$/23.2% $Fe^{2+}$, and 100% $Fe^{3+}$/0.00% $Fe^{2+}$. The total concentration of iron in each sample was 0.92 M. Again, the state of charge (SOC) of each solution is defined to be the percentage of the $Fe^{3+}$ species.

A 0.3 cm diameter glassy carbon disc working electrode (Bioanalytical Systems, Inc.), with a surface area of 0.071 cm², and a 0.4 cm glassy carbon rod (Alfa Aesar) with a surface area of approximately 5 cm² were placed into contact with each solution and connected to a potentiostat. The glassy carbon rod was connected as both the counter and reference electrode.

In these cases, the potential of the working electrode was set to +0.2 V and held for over 60 seconds while recording the current ($I_{lim,ox}$). Subsequently the potential was set to −0.2 V and held for over 60 seconds while recording the current ($I_{lim,red}$). Measurements were taken without stirring of the solutions. The resulting currents are plotted in FIGS. 6, 7, 8, and 9. The current at 60 s was taken to be the constant current for each hold. The measured constant currents, ratio of the currents, and the resulting SOC (or % $Fe^{3+}$) are listed in Table 2. The SOC was calculated using:

$$SOC = 100 \frac{A \frac{I_{lim,red}}{I_{lim,ox}}}{1 + A \frac{I_{lim,red}}{I_{lim,ox}}}$$

with the coefficient A taken to be 1.

TABLE 2

Limiting Currents and SOC for $Fe^{3+}/Fe^{2+}$ Samples - Example 2

| Calculated (as prepared) | Experimental | | | |
|---|---|---|---|---|
| SOC (% $Fe^{3+}$) | $I_{lim, ox}$ | $I_{lim, red}$ | $I_{red}/I_{ox}$ | SOC (% $Fe^{3+}$) |
| 36.0 | −1.11 mA | 0.548 mA | 0.49 | 33.1 |
| 53.4 | −0.791 mA | 0.842 mA | 1.06 | 51.6 |
| 76.8 | −0.318 mA | 1.23 mA | 3.87 | 79.5 |
| 100 | −0.00276 | 1.54 mA | 556 | 99.8 |

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A method of determining a ratio of oxidized and reduced forms of a redox couple in solution, said method comprising:
    (a) contacting a first stationary working electrode and a first counter electrode to the solution;
    (b) applying a first potential at the first stationary working electrode relative to the first counter electrode and measuring a first constant current;
    (c) applying a second potential at the first stationary working electrode relative to the first counter electrode and measuring a second constant current; and
    (d) determining the ratio of oxidized and reduced forms of the redox couple in solution based on the ratio of the absolute values of the first and second constant currents;
    wherein the first and second constant currents have opposite signs, and
    wherein the first stationary working electrode and first counter electrode each has a surface area contacting the solution, and the surface area of the first stationary working electrode contacting the solution is less than 20% of that of the surface area of the first counter electrode contacting the solution.

2. The method of claim 1, wherein the first potential is more positive than an equilibrium potential of the redox couple, and the second potential is more negative than the equilibrium potential of the redox couple.

3. The method of claim 2, wherein a magnitude of a difference between the first potential and an equilibrium potential and a magnitude of a difference between the equilibrium potential and the second potential are substantially the same.

4. The method of claim 1, wherein the first and second potentials are of substantially the same magnitude but opposite in sign.

5. The method of claim 1, wherein the ratio of the oxidized and reduced forms of the redox couple are in a range of from about 5:95 to 95:5.

6. The method of claim 1, wherein the ratio of the oxidized and reduced forms of the redox couple are in a range of from about 20:80 to 80:20.

7. The method of claim 1, wherein the redox couple comprises a metal or metalloid of Groups 2-16, including the lanthanide and actinide elements, or a coordination compound thereof.

8. The method of claim 1, wherein the redox couple is a reversible redox couple.

9. The method of claim 1, wherein the solution is an aqueous solution.

10. The method of claim 1, wherein the solution is a non-aqueous solution.

11. The method of claim 1, wherein the solution is moving.

12. The method of claim 1, wherein at least one of the first stationary working electrode or the first counter electrode comprises an allotrope of carbon.

13. The method of claim 1, wherein a constancy of at least one of the first or second constant currents is characterized by a change of less than 0.1% over one second or less than 1% over ten seconds.

14. The method of claim 1, wherein the solution is contained within a half-cell fluidic loop of an operating flow battery cell or other operating electrochemical cell, said operating electrochemical cell generating or storing electrical energy.

15. The method of claim 1, wherein the ratio of oxidized and reduced forms of the redox couple in solution based on the ratio of the absolute values of the first and second constant currents is determined by applying an experimentally derived correction factor.

16. The method of claim 1, wherein the redox couple is a reversible redox couple.

17. The method of claim 1, wherein the redox couple is a quasi-reversible redox couple.

18. A method of maintaining an electrochemical cell, the cell having at least one half-cell comprising oxidized and reduced forms of a redox couple in solution, the method comprising:
determining the ratio of the oxidized and reduced forms of the redox couple in solution according to the method of claim 1; and
oxidizing or reducing the solution, so as to alter a balance of the oxidized and reduced forms of the redox couple in solution, to a degree dependent on the ratio of the absolute values of the first and second constant currents.

19. The method of claim 18, wherein the first potential is more positive than an equilibrium potential of the redox couple and the second potential is more negative than the equilibrium potential of the redox couple.

20. The method of claim 19, wherein the magnitude of the difference between the first potential and the equilibrium potential and the magnitude of the difference between the equilibrium potential and the second potential are substantially the same.

21. The method of claim 20, wherein the first and second potentials are of substantially the same magnitude but opposite in sign.

22. The method of claim 18, wherein the ratio of the oxidized and reduced forms of the redox couple are in a range of from about 5:95 to 95:5.

23. The method of claim 18, wherein the ratio of the oxidized and reduced forms of the redox couple are in a range of from about 20:80 to 80:20.

24. The method of claim 18, wherein the redox couple comprises a metal or metalloid of Groups 2-16, including the lanthanide and actinide elements, or a coordination compound thereof.

25. The method of claim 18, wherein the redox couple is a reversible redox couple.

26. The method of claim 18, wherein the solution is an aqueous solution.

27. The method of claim 18, wherein the solution is a non-aqueous solution.

28. The method of claim 18, wherein the solution is moving.

29. The method of claim 18, wherein at least one of the first stationary working electrode or the first counter electrode comprises an allotrope of carbon.

30. The method of claim 18, wherein a constancy of at least one of the first or second constant currents is characterized by a change of less than 0.1% over one second or less than 1% over ten seconds.

31. The method of claim 18, wherein the solution is contained within a half-cell fluidic loop of an operating flow battery cell or other operating electrochemical cell, said operating electrochemical cell generating or storing electrical energy.

32. The method of claim 18, wherein oxidizing or reducing the solution is performed electrochemically.

33. The method of claim 32, wherein oxidizing or reducing the solution takes place in a rebalancing sub-system within a half-cell fluidic loop of an electrochemical cell.

34. A device comprising:
at least one pair of electrodes independently in fluidic contact with an electrolyte solution, each pair of electrodes consisting of a first stationary working electrode and a first counter electrode;
a control system, including a power source and sensors, associated with each pair of electrodes, said control system configured to be capable of applying first and second electric potentials at each of the first working electrodes relative to the first counter electrodes, and measuring first and second currents associated with said first and second electric potentials; and
software capable of calculating the ratio of the absolute values of the first and second currents between each electrode pair, which reflects the ratio of the oxidized and reduced forms of a redox couple in solution; and
the device used in the implementation of the method of claim 1.

* * * * *